United States Patent [19]

Quarles et al.

[11] Patent Number: 5,294,453
[45] Date of Patent: Mar. 15, 1994

[54] METHOD OF REMOVING OFF-FLAVOR COMPONENTS FROM HYDROXYPROPYL STARCH HYDROLYZATE PRODUCTS

[75] Inventors: James M. Quarles; Duane Tackaberry, both of Cedar Rapids, Iowa

[73] Assignee: Penwest, Ltd., Bellevue, Wash.

[21] Appl. No.: 878,826

[22] Filed: May 5, 1992

Related U.S. Application Data

[63] Continuation-in-part of Ser. No. 577,691, Sep. 4, 1990, Pat. No. 5,110,612.

[51] Int. Cl.$^5$ .................. A23L 1/236; A23L 1/187; A23L 1/06; A21D 8/00
[52] U.S. Cl. ................... 426/548; 426/658; 426/661; 536/111; 127/29; 127/38; 127/42
[58] Field of Search ............ 536/111; 127/29, 38, 127/42; 426/658, 661, 548

[56] References Cited

U.S. PATENT DOCUMENTS

| | | |
|---|---|---|
| 3,505,110 | 4/1970 | Kesler et al. |
| 3,577,407 | 5/1971 | Hjermstad . |
| 4,452,978 | 6/1984 | Eastman . |
| 4,837,314 | 6/1989 | Eastman . |
| 4,956,458 | 9/1990 | Luo et al. . |
| 5,091,015 | 2/1992 | Bunick et al. .......... 127/30 |
| 5,110,612 | 5/1992 | Quarles et al. . |

FOREIGN PATENT DOCUMENTS 129454 1/1978 German Democratic Rep. .

OTHER PUBLICATIONS

E. E. Rice, Journal of Nutrition, 61:253 (1957).

*Primary Examiner*—Joseph Golian
*Attorney, Agent, or Firm*—Marshall, O'Toole, Gerstein, Murray & Borun

[57] ABSTRACT

A method of treating hydrolyzate products of hydroxypropylated starch to remove low molecular weight off-flavor compounds is disclosed along with improved bulking agents produced by removal of off-flavor compounds and incorporation of low molecular weight hydrolyzate products.

17 Claims, No Drawings

METHOD OF REMOVING OFF-FLAVOR COMPONENTS FROM HYDROXYPROPYL STARCH HYDROLYZATE PRODUCTS

This is a continuation-in-part of application Ser. No. 07/577,691 filed Sep. 4, 1990 which is now U.S. Pat. No. 5,110,612.

BACKGROUND OF THE INVENTION

The present invention relates generally to hydrolyzate products of hydroxypropyl starch which are useful as low calorie bulking agents for use in substitutes for sucrose and other starch hydrolyzate products. More specifically, the invention relates to methods of removing off-flavor components from hydroxypropyl starch hydrolyzate products and improved products resulting therefrom.

Of interest to the present invention is the disclosure of Kesler et al., U.S. Pat. No. 3,505,110 which discloses low calorie sugar products prepared by hydrolysis of hydroxypropylated starch. Kesler discloses methods for preparing hydrolysis products of hydroxypropyl starch which are characterized by a DE of from 1 to 30 and are said to be composed principally of glucose and hydroxypropylated polysaccharides and contain little or no (preferably less than 0.5%) maltose. Kesler discloses what are characterized to be preferred methods for producing the hydrolyzate product comprising hydrolyzing hydroxypropyl starch with a liquefying enzyme to breakup the long chain starch molecules and then treating with a saccharifying enzyme to further hydrolyze the intermediate length molecules to produce glucose (having a degree of polymerization (DP of 1) to the substantial exclusion of maltose (DP 2). While the products of Kesler were characterized as being intended for use as substitutes for ordinary sugar, those products fail to be characterized by bulking properties suitable for use as a sucrose replacer in a wide variety of food products.

Quarles et al., U.S. Pat. No. 5,110,612, the disclosure of which is incorporated by reference, discloses the discovery that hydrolyzate products of hydroxypropyl starch, which comprise greater than about 15% by weight DP 2-6 hydrolyzate polymers and are characterized by a DE value of from about 20 to about 45, have bulking agent properties similar to those of sucrose. Quarles discloses that hydrolyzate products of hydroxypropyl starch produced by conventional acid and/or enzyme hydrolysis are generally unsuitable for use as sucrose substitutes unless they comprise greater than about 15% by weight DP 2-6 hydrolyzate polymers and a DE value greater than about 20. Quarles discloses that hydrolyzate products of hydroxypropylated starch having such elevated levels of "middle range" DP 2-6 starch polymers and accordingly reduced levels of DP 1 monomers and longer chain polymers (DP 7+) exhibit improved properties as food ingredients at any given DE value when compared with hydroxypropyl starch hydrolyzate products characterized by reduced levels of DP 2-6 starch polymers and elevated levels of DP 1 monomers and DP 7+ starch polymers.

Of interest to the present application is the fact that the hydroxypropyl starch hydrolyzate products of Quarles are characterized by a bitter off-flavor which renders those products undesirable for certain food applications.

SUMMARY OF THE INVENTION

The present invention provides a method of treating hydrolyzate products of hydroxypropyl starch to produce a low calorie bulking agent characterized by improved flavor. Specifically, it has been discovered that bitter off-flavors associated with conventional hydrolysis products of hydroxypropyl starch have molecular weights of from about 200 to about 350 daltons (i.e., roughly between the molecular weights of glucose (180) and maltose(342)) and are likely to be one or more isomers of mono-, di- or tri-hydroxypropyl glucose. The invention, therefore, provides methods of treating a hydrolyzate product of hydroxypropyl starch to produce a low calorie bulking agent with improved flavor comprising the steps of obtaining a hydrolyzate product of hydroxypropyl starch and removing low molecular weight off-flavor components characterized by molecular weights of from about 200 to about 350 daltons from the hydrolyzate product.

Because various processes for the removal of the low molecular weight off-flavor components also remove substantial portions of glucose, maltose and other low molecular weight hydrolyzate components and can render the resulting product unsuitable for use as a bulking agent, the present invention also provides a process whereby starch hydrolyzate components including glucose, and DP 2 and DP 3 polymers are added to the hydrolyzate product such that the resulting product comprises greater than about 15% by weight DP 2-6 polymers, is characterized by a DE value of from about 12 to about 45 and a weighted DP 1-3 content such that the sum of $C_1 + 0.5(C_2) + 0.2(C_3)$ is greater than about 5 wherein $C_1$, $C_2$ and $C_3$ are the respective weight percent concentrations of DP 1 monomers, DP 2 polymers and DP 3 polymers in the final product.

DETAILED DESCRIPTION

The present invention provides a method of treating hydrolyzate products of hydroxypropyl starch to produce a low calorie bulking agent characterized by improved flavor. Specifically, it has been discovered that bitter off-flavor components associated with hydroxypropyl starch hydrolyzate products have molecular weights between about 200 daltons and 350 daltons and are likely to be one or more isomers of hydroxypropyl glucose. For example, hydroxypropyl glucose has a molecular weights of about 238 daltons while the molecular weights of dihydroxypropyl glucose and trihydroxypropyl glucose are 296 daltons and 354 daltons respectively. When the low molecular weight off-flavor components were removed from a hydroxypropyl starch hydrolyzate product by use of simulated moving bed chromatography according to the invention, the low molecular weight filtrate comprised at least two components between glucose and maltose when analyzed by high performance liquid chromatography (HPLC). This is surprising because the flavor bodies that arise from the degradation of glucose when unmodified dent corn (pearl) starch is hydrolyzed include hydroxymethyl furfural (HMF) Which is smaller than glucose.

A method is hereby provided whereby a hydroxypropyl starch hydrolyzate product is treated by purification means such as ultrafiltration, reverse osmosis or simulated moving bed chromatography to remove low molecular weight off-flavor components. Because it is generally impractical to remove only the off-flavor components, substantial portions of glucose (DP 1), maltose (DP 2) and other low molecular weight hydrolyzate products are removed in the course of removing the impurities. In particular, virtually all of the glucose and as much as 75% or more of the DP 2 polymers can be removed by methods such as reverse osmosis and ultrafiltration when those methods are used to reduce the concentration of low molecular weight off-flavor components to a tolerable level. When these low molecular weight materials are removed from the hydrolyzate product, the DE is typically reduced below 20 and moreover, the concentration of the lowest molecular weight hydrolyzate components is sufficiently reduced such that the product no longer functions properly as a sucrose replacer.

It has surprisingly been discovered that low molecular weight hydrolyzate products including glucose, DP 2 and/or DP 3 hydrolyzate polymers may be added to the hydrolyzate product to produce a product suitable for use as a low calorie bulking agent even though the resulting product is characterized by a DE which remains less than 20. While the resupplemented products might comprise lower levels of glucose and DP 2 and DP 3 monomers than prior to the off-flavor removal step, the products surprisingly still function as improved sucrose replacers. While a hydroxypropyl starch hydrolyzate product produced by conventional acid and/or enzyme hydrolysis of hydroxypropyl starch must generally comprise greater than about 15% by weight DP 2-6 hydrolyzate polymers and be characterized by a DE value of from about 20 to about 45 in order to have satisfactory properties as a bulking agent, it has been surprisingly discovered that hydrolyzate products subjected to the off-flavor component removal method of the invention are characterized by suitable bulking agent properties when they comprise greater than about 15% by weight DP 2-6 hydrolyzate polymers and are characterized by a DE value of from about 12 to about 45 provided that they comprise a DP 1-3 content such that the sum of $C_1 + 0.5(C_2) + 0.2(C_3)$ is greater than about 5 wherein $C_1$, $C_2$ and $C_3$ are the respective weight percent concentrations of DP 1 monomers, DP 2 polymers and DP 3 polymers in the final hydrolyzate product.

Hydroxypropyl starch hydrolyzate products for which the invention is useful may be produced according to conventional methods such as those disclosed in the copending parent application. Such methods involve the controlled hydrolysis of hydroxypropylated starch to yield a desired distribution of hydrolyzate products. Hydroxypropylated starches subjected to the hydrolysis methods may be produced from a variety of starch materials according to methods known in the art. Suitable methods for hydroxypropylating such starches include those described in Kesler, U.S. Pat. No. 3,505,110; Hermstad, U.S. Pat. No. 3,577,407; Eastman, U.S. Pat. No. 4,452,978; and Eastman, U.S. Pat. No. 4,837,314, the disclosures of which are hereby incorporated by reference. The hydroxypropylated starch materials should have a level of hydroxypropyl substitution sufficient to substantially reduce the caloric content of the starch hydrolyzate. Preferred starch materials should comprise greater than about 8% (by weight) hydroxypropyl substitution and preferably between about 9% and about 15% (by weight) hydroxypropyl substitution.

The methods of the present invention are useful for application to products produced by either enzyme or acid hydrolysis of hydroxypropylated starch according to conventional methods. Preferred hydrolyzate products are those produced by the method of treating the hydroxypropylated starch by acid hydrolysis, either alone or in conjunction with enzyme hydrolysis, with enzyme hydrolysis either preceding or following the acid hydrolysis step. Suitable enzymes include α-amylases with bacterial α-amylases being preferred. Preferred hydrolyzate products include those which are first hydrolyzed to a DE of from about 2 to about 15 and which are then acid hydrolyzed to a DE between about 20 and 45. Particularly preferred hydroxypropyl starch hydrolyzate products for use with the invention are those comprising greater than about 15% by weight DP 2-6 hydrolyzate polymers and characterized by a DE value of from about 20 to about 45 with products comprising from about 20% to 30% by weight DP 2-6 starch polymers being most preferred.

While the conventionally produced hydroxypropyl starch hydrolyzate products comprising greater than about 15% by weight DP 2-6 hydrolyzate polymers and having DE values between about 20 and 45 have excellent bulking properties per se, they are typically characterized by a bitter low molecular weight off-flavor. This off-flavor may be reduced or eliminated by removal of hydrolyzate fractions characterized by molecular weights of form about 200 to about 350 daltons according to conventional purification methods. Such purification methods include reverse osmosis, ultrafiltration and simulated moving bed chromatography. As a further aspect of the invention, it has been discovered that incorporating low molecular weight materials such as glucose or ethanol into the hydrolyzate material during the ultrafiltration process functions to reduce the levels of DP 2 and higher hydrolyzate products that are removed during the ultrafiltration step relative to the undesired off-flavor components. It is also contemplated that those of ordinary skill in the art provided with the teachings of the invention would be able to apply other isolation and purification methods to remove the low molecular weight off-flavor components from hydroxypropyl starch hydrolyzate products. Such methods could include, but are not limited to, affinity purification, solvent based extraction and supercritical fluid extraction. One of ordinary skill can determine the suitable extent of extraction by the simple expedient of conducting a taste test on the extracted product.

When any of the purification methods are used according to the invention, it is preferred that the method be as selective as possible in removing the off-flavor component or components in preference to desired components including glucose, and higher molecular weight materials including maltose, maltotriose and hydroxypropylated maltose and maltotriose. Accordingly, membrane pore sizes should be carefully selected when using reverse osmosis and ultrafiltration methods and chromatography conditions should be carefully selected when using simulated moving bed chromatography and other chromatographic methods in order to minimize the extraction of desired lower and higher molecular weight species on either side of the off-flavor components.

Ideally, the method for extraction of the low molecular weight off-flavor component is sufficiently specific that no substantial amount of either glucose or DP 2 or higher hydrolyzate products are removed from the product. In such a case, the removal of the relatively minor quantity of the off-flavor component is unlikely to affect the bulking properties of the hydrolyzate product and it may not be necessary to add other hydrolyzate products (including glucose) to the product in order to optimize its bulking properties. For example, some chromatographic methods, such as simulated moving bed chromatography, are capable of removing a specific fraction from a composition by effectively simultaneously adding and extracting materials of various molecular weights. Nevertheless, most economically suitable extraction methods including ultrafiltration and reverse osmosis remove as much as 100% of the glucose and 75% of the DP 2 polymers in the course of removing substantially all of the low molecular weight off-flavor components. The removal of glucose and other low molecular weight hydrolyzate materials can adversely affect the bulking properties of the hydrolyzate product, not just by reducing the DE of the product, but by affecting the overall molecular weight distribution of the product. Even though the resulting products still comprise greater than 15% by weight DP 2-6 polymers, the depletion of DP 2 and DP 3 polymers combined with the absence of glucose can render those products unsuitable for use as bulking agents.

As one aspect of the invention, it has been discovered that hydroxypropyl starch hydrolyzate products comprising reduced DP 1-3 low molecular weight components can be rehabilitated to provide satisfactory bulking agents by adding low molecular weight starch hydrolyzate components to the hydrolyzate product. Preferably, low molecular weight hydrolyzate materials are added such that the resulting product comprises greater than about 15% by weight DP 2-6 hydrolyzate polymers, is characterized by a DE value of from about 12 to about 45 and is characterized by a DP 1-3 content such that the sum of $C_1 + 0.5(C_2) + 0.2(C_3)$ is greater than about 5 wherein $C_1$, $C_2$ and $C_3$ are the respective weight percent concentrations of DP 1 monomers, DP 2 polymers and DP 3 polymers in the final product. Low molecular weight hydrolyzate materials that can be added include glucose, maltose, and maltotriose as well as hydroxypropyl maltose and hydroxypropyl maltotriose. The addition of minor amounts of low molecular weight hydrolyzate products has the surprising effect of rehabilitating the bulking agent properties of the hydrolyzate products even though the resulting products have DE levels of less than 20. The addition of glucose has the most dramatic effect, but its addition is not required and higher molecular weight materials such as maltose or maltotriose can be incorporated instead. In general, greater amounts of maltose, and still greater amounts of maltotriose, are required to have an effect equivalent to that of glucose. Nevertheless, combinations of one or more of the DP 1-3 hydrolyzate products can be used to rehabilitate the hydrolyzate product from which the off-flavor component has been removed.

Low molecular weight or other starch hydrolyzate components can be added before, after, or even during the removal of the off-flavor components. While it is generally preferred that such materials be added after removal of the off-flavor components, methods such as simulated moving bed chromatography procedures effectively add some components as they simultaneously remove others.

The method of removing low molecular weight off-flavor components is effective for all manner of hydroxypropyl starch hydrolyzate products, and low and intermediate molecular weight hydrolyzate components throughout the range of DP 1-7 products can be added to produce suitable bulking agent compositions where those compositions are deficient with respect to DE, concentration of DP 2-6 polymers, or concentration of DP 1-3 hydrolyzate materials. Nevertheless, preferred bulking agent compositions are produced by removing low molecular weight off-flavor components from a hydrolyzate product which, prior to such treatment, comprises greater than about 15% by weight DP 2-6 hydrolyzate polymers and is characterized by a DE value of from about 20 to about 45. The low molecular weight off-flavor components may then be removed and, if necessary, low molecular weight starch hydrolyzate components added such that the resulting product comprises greater than 15% DP 2-6 polymers, is characterized by a DE of from about 12 to about 45 and the DP 1-3 content specified above.

The hydroxypropyl starch hydrolyzate products from which off-flavors have been removed according to the invention provide a variety of improved bulking properties to food products including improved water holding properties. In baked products, for example, the hydrolyzate products function to preserve freshness by preventing drying. The hydrolyzate products also contribute improved freeze-thaw stability to products in which they are incorporated because the modified carbohydrate molecules tend not to retrograde so as to cause syneresis of the food product in which they are incorporated. In addition, the hydrolyzate products provide improved properties with respect to inhibition of water crystal formation in food products in which they are incorporated.

The invention provides reduced calorie sweetener compositions comprising the improved hydroxypropyl starch products of the invention combined with a high potency sweetener. Suitable high potency sweeteners would be apparent to those of ordinary skill in the art with preferred sweeteners including dipeptide sweeteners such as aspartame, alitame, proteinaceous sweeteners such as monellin and thaumatin and other sweeteners such as acesulfame K, sodium saccharine, cyclamates and sucralose.

The invention further provides improved methods for reducing the calorie content of food products comprising sucrose or other starch hydrolyzate products such as corn syrups, corn syrup solids or high fructose corn syrups. According to the method of the invention, all or a portion of the sucrose or starch hydrolyzate product may be replaced with a hydroxypropyl starch hydrolyzate product produced according to the invention. The sweetness provided by the removed sucrose or starch hydrolyzate may, in turn, be replaced in whole or in part by incorporation of a high potency sweetener.

Improved food products of the invention include virtually any food product comprising significant amounts of sucrose or other starch hydrolyzate products. The invention is most suited for those food products comprising substantial levels of sucrose or starch hydrolyzate products and which then contribute substantial quantities of calories to the food product. Food products which are particularly suited for practice of the invention include bake goods; frozen dessert products such as ice milks, ice creams, quiescent frozen confections, and the like; icings and frostings; dessert fillings such as for cakes or pies, puddings; confections; jams, jellies and preserves; dry beverage mixes; gelatin based desserts; salad dressings including pourable and spoonable salad dressings; and syrups and dessert toppings such as chocolate syrups.

Example 1

According to this example, a reverse osmosis system was used to remove low molecular weight off-flavor components from a hydroxypropyl starch hydrolyzate product. Specifically, hydroxypropyl starch was prepared and hydrolyzed according to the methods of U.S. Pat. No. 5,110,612 by combination of acid and alpha-amylase enzyme hydrolysis to yield product 1A, a hydroxypropyl starch product comprising 24.3% by weight DP 2-6 polymers and characterized by an estimated DE of about 27. The hydrolyzate product was then placed in a 30 gallon tank and diluted with about 15 gallons of ion exchange purified water for each ultrafiltration run. The hydrolyzate product was then passed multiple times through a Dow GE2540FF ultrafiltration membrane equipped with a 1000 amu (atomic mass unit) cutoff at a temperature of about 140° F. and a pressure of 250-350 psi. Multiple passes were made through the reverse osmosis system with from 10 to 15 gallons of permeate removed each pass. The retentate material was sampled to determine whether the off-flavor components had been removed. The off-flavor components were substantially eliminated when sufficient material had been removed such that the DP 2 polymer content was between about 1.5 and 2.0% by weight. At this point, the product comprised less than 1% glucose.

Sufficient glucose was then added to the product to bring the glucose concentration to 8.47%. The resulting product 1B was characterized by a DE of 22.3, comprised 17.7% by weight DP 2-6 polymers and had a weighted DP 1-3 content $(C_1+0.5(C_2)+0.2(C_3))$ of 10.4%. Yellow cakes were prepared using either the reconstituted bulking agent as a sucrose replacement or sucrose as a control. Cakes were prepared according to standard methods utilizing the ingredients of Table 1 below. Specifically, 450 grams of the cake mix was placed in a well greased and floured eight inch cake pan and baked at 350° F. for 35 minutes.

TABLE 1

| Formula for Standard Yellow Cake | |
|---|---|
| Ingredients | Amount (grams) |
| Cake Flour | 315 |
| Baking Powder | 6 |
| Salt | 6 |
| Sucrose | 250 |
| Shortening | 110 |
| Milk (1% fat) | 245 |
| Vanilla | 6 |
| Eggs (whole) | 101 |

The control cakes comprising sucrose were slightly domed and cut cleanly with no gumminess. The crumb was fine and very good. The cakes comprising product 1B of the invention compared favorably with the control. They were domed more than the control cakes and had a hard crust. The crumb of the cakes was slightly more open than the control but very similar to it. The cakes comprising product 1B exhibited a little gumminess but had a clean melt in the mouth similar to that of the sucrose containing controls.

Example 2

In this example, a hydroxypropyl starch hydrolyzate product (2A) comprising 22.7% by weight DP 2-6 polymers and characterized by an estimated DE of 27, was subjected to reverse osmosis treatment generally according to Example 1 with the exception that glucose was added to the hydrolyzate product during each extraction run. Glucose was also added to the hydrolyzate product at the conclusion of the reverse osmosis extraction in order to increase the glucose concentration to 5.22%. The resulting product (2B) was characterized by a DE of 18.6, comprised 18.6% by weight DP 2-6 polymers and had a weighted DP 1-3 content of 6.7%.

Yellow cakes were produced using product 2B as a replacement for sucrose according to the recipe of Example 1. The resulting cakes were more domed than those produced by using the product of the Example 1 but had a similar texture and mouthfeel and were generally comparable to the control.

Example 3

In this example, a hydroxypropyl starch hydrolyzate product (3A) comprising 26.7% by weight DP 2-6 polymers and characterized by an estimated DE of 27, was subjected to reverse osmosis processing according to the method of Example 1 to remove the low molecular weight off-flavor components but did not have glucose added after the reverse osmosis procedure. The resulting product (3B) comprised 24.8% DP 2-6 polymers and was characterized by a DE of 16.5 but had a weighted DP 1-3 content of 4.5%.

Yellow cakes were produced using product 3B as a substitute for sucrose according to the recipe of Example 1. The cakes were more gummy, were more domed and were harder to cut than those produced with the hydrolyzate products of Examples 1 and 2. Overall, the cakes were considered to be less than acceptable commercially.

Example 4

According to this example, a simulated moving bed chromatography system (ADSEP, Illinois Water Treatment, Rockford, Ill.) using a sodium form strong acid cation resin (Illinois Water Treatment SM-48) was used to remove the low molecular weight off-flavor compounds from a hydroxypropyl starch hydrolyzate product. Specifically, a hydroxypropyl starch hydrolyzate product (4A) characterized by a DE of 24.4, comprising 17.8% DP 2-6 polymers and having a weighted DP 1-3 content of 14.1 was subjected to a simulated moving bed chromatography process to remove low molecular weight off-flavor components. The resulting product (4B) comprised only 0.3% glucose, was characterized by a DE of 14.4 and had a DP 2-6 content of 25.8% and a weighted DP 1-3 content of 5.2%.

Yellow cakes were produced according to the recipe of Example 1 using the products 4A and 4B as sucrose substitutes. The cakes resulting from product 4A from which the off-flavor components had not been removed were slightly domed but were superior to the other hydroxypropyl starch hydrolyzate products of examples 1-3 and were similar to the sucrose containing control with respect to texture and mouthfeel. The cakes comprising product 4B as a sucrose substitute were slightly domed and had a mouth feel similar to those of the product of Example 1. The crumb was good, although slightly more open than the control.

Example 5

In this example, a hydroxypropyl starch hydrolyzate product (5A) comprising a DP 2-6 content of 24.5 and characterized by an estimated DE of 27 was subjected to a reverse osmosis procedure according to the method of Example 1 in order to remove the low molecular weight off-flavor components. Glucose was added during the first reverse osmosis extraction step and at the conclusion of the reverse osmosis such that the resulting product had a glucose content of 9.4%. Specifically, the final product (5B) was characterized by a DE of 25.4, a DP 2-6 content of 18.6% and a weighted DP 1-3 content of 11.7%.

A cake was produced using the product 5B as a sucrose substitute according to the recipe of Example 1. The cake had a thicker skin and was more domed than the sucrose containing control cake but was otherwise similar to the cakes produced with the products of Examples 1 and 2.

Example 6

In this example, a hydrolyzate product of hydroxypropyl starch was subjected to a reverse osmosis procedure according to Example 1 to remove low molecular weight off-flavor components. The starting product (6A) was characterized by a DE of 26.2, a DP 2-6 content of 20.8% by weight and a bitter off-flavor. Samples of successive reverse osmosis runs were analyzed by HPLC to determine the DP distribution and by taste to determine the presence of the off-flavor components with the results shown in Table 2 below.

TABLE 2

| Example | DP 1 (%) | DP 2 (%) | DP 3 (%) | DP 4 (%) | DP 5 (%) | DP 6 (%) | DP 7+ (%) | DE | DP 2-6 (%) | Wtd. DP 1-3 (%) | Off Flavor Content |
|---|---|---|---|---|---|---|---|---|---|---|---|
| 6A | 11.7 | 8.3 | 5.7 | 3.5 | 2.1 | 1.2 | 67.5 | 26.2 | 20.8 | 17.0 | Strong |
| 6B | 2.1 | 4.6 | 6.1 | 4.7 | 3.2 | 1.9 | 77.5 | 16.3 | 20.5 | 5.6 | Strong |
| 6C | 0.1 | 3.7 | 6.9 | 5.5 | 3.7 | 2.3 | 77.9 | 13.0 | 22.1 | 3.3 | Weak |
| 6D | 0.0 | 2.8 | 6.4 | 5.5 | 3.8 | 2.2 | 79.3 | 13.0 | 20.7 | 2.7 | None |
| 6E | 0.0 | 2.1 | 5.9 | 5.6 | 4.0 | 2.4 | 80.2 | 12.4 | 20.0 | 2.2 | None |
| 6F | 0.0 | 1.1 | 4.8 | 5.4 | 4.0 | 2.4 | 82.3 | 11.7 | 17.7 | 1.5 | None |

As is apparent from Table 2, the reverse osmosis procedure directed to removal of the off-flavor component removes substantially all of the glucose in the hydrolyzate compositions along with significant amounts of the DP 2 polymers. The off-flavor had been almost entirely removed in product 6C which comprised 0.1% by weight glucose and 3.7% DP 2 and was completely removed in product 6D comprising 0.0% glucose and 2.8% DP 2. Further reverse osmosis treatment which likely removed sub-threshold amounts of the off-flavor components also removed DP 2 and DP 3 polymers.

Example 7

In this example, yellow cakes were produced with hydrolyzate products 6A, 6C, 6D, 6E and 6F of Example 6 as sucrose substitutes to determine the utility of those products as bulking agents. Cakes were prepared according to standard methods utilizing the ingredients of Table 3 below. Specifically, the first eight ingredients were dry blended for one minute followed by blending of the eggs with 19 grams of water for an additional minute. Next, vanilla and 41 grams of water were blended for one minute followed by blending of the remaining water for two minutes. A 365 gram quantity of batter was then placed in a well greased round cake pan and baked at 350° F. for 22 minutes.

TABLE 3

| Formula for Standard Yellow Cake | |
|---|---|
| Ingredients | Amount (grams) |
| Shortening | 91 |
| Sucrose | 242 |
| Instant Clear Gel | 4 |
| Whey | 20 |
| Cake Flour | 192 |
| Salt | 6 |
| Wheat Starch | 10 |
| Baking Powder | 9 |
| Vanilla | 6.5 |
| Water | 168 |
| Eggs (whole) | 101 |

While products 6C, 6D, 6E and 6F had superior taste properties to unextratcted hydrolyzate 6A, they did not have suitable bulking agent properties. Each of the cakes produces with products 6C, 6D, 6E and 6F were characterized by a wet and chewy mouth feel, thick or heavy crust and gumminess. See Table 4 below. Even though the hydrolyzate products had DP 2-6 contents of at least 17.7% by weight, the distribution of low molecular weight materials was such their weighted DP 1-3 contents ranged from only 1.5 to 3.2. The absence of low molecular weight materials in the DP 1-3 range thus rendered those products unsuitable for use as bulking agents.

Example 8

In this example, glucose was added to hydrolyzate products 6C, 6D, 6E and 6F and yellow cakes were baked substituting the products for sucrose according to the recipe of Example 7 to determine the effect on bulking properties of the products. These experiments, the results of which are disclosed in Table 4, show that incorporation of 5% or greater glucose into the hydrolyzate products, such that t/he DE exceeds about 12 and the weighted DP 1-3 content is about 5% or greater, results in products with suitable bulking properties for replacement of sucrose in baked goods and other food products.

TABLE 4

| Example | DE | DP 2-6 (%) | Weighted DP 1-3 (%) | Cake Properties |
|---|---|---|---|---|
| 6C | 13.0 | 22.1 | 3.3 | Unsatisfactory, heavy crumb, thick crust, peeling, poor symmetry, poor resiliency and gummy. |
| 6D | 13.0 | 20.7 | 2.7 | Unsatisfactory, peeling, thick crust, some unevenness in grain, poor resiliency and gummy. |
| 6E | 12.4 | 20.0 | 2.2 | Unsatisfactory, heavy crumb, poor symmetry, peeling, heavy crumb, thick |

TABLE 4-continued

| Example | DE | DP 2-6 (%) | Weighted DP 1-3 (%) | Cake Properties |
|---|---|---|---|---|
| 6F | 11.7 | 17.7 | 1.5 | crust, poor resiliency and gummy. Unsatisfactory, heavy crumb, poor symmetry (doming and uneven), peeling, heavy crust, poor resilience and gummy. |
| 6C + 5% Glu | 16* | 20.8 | 8.1 | Too moist, some peeling with better resiliency and better appearance than 6F + 5% glucose. |
| 6F + 5% Glu | 14* | 16.8 | 6.4 | Peeling, tunneling, wet but good symmetry. Much better than cakes of 6C-6F. |
| 6D + 10% Glu | 20* | 18.7 | 12.4 | Good symmetry and grain, texture slightly wet but good, good resiliency. |
| 6E + 10% Glu | 20* | 18.0 | 12.0 | Some peeling but better than cakes of 6C-6F. Slightly thick crust, still wet and some loss of resiliency overall. |
| 6F + 10% Glu | 19* | 16.0 | 11.4 | Some peeling but better than cakes of 6C-6F. Slightly thick crust, still wet and some loss of resiliency overall. |

*Estimated DE.

Example 9

In this example, a particularly preferred hydroxypropyl starch hydrolyzate product was produced by means of reverse osmosis treatment to yield a product (9A) characterized by an estimated DE of 11, a DP 2-6 content of 21.1% and a weighted DP 1-3 content of 2.8%. Glucose was then added to produce a product (9B) characterized by an estimated DE of 18, a DP 2-6 content of 17.8% and a weighted DP 1-3 content of 10.4%. Product 9B was then substituted for sucrose in the yellow cake formula of Example 7. The resulting cake was considered very good with some peeling, and good symmetry, crust, texture and grain.

Table 5 provides a summary of the various materials discussed herein. Numerous modifications and alternative embodiments of the invention will be apparent to those skilled in the art in view of the foregoing description. Accordingly, this description is to be construed as illustrative only and only such limitations should be placed on the invention as are set out in the following claims.

TABLE 5

| Example | DP 1 (%) | DP 2 (%) | DP 3 (%) | DP 4 (%) | DP 5 (%) | DP 6 (%) | DP 7+ (%) | DE | DP 2-6 (%) | Wtd. DP 1-3 (%) |
|---|---|---|---|---|---|---|---|---|---|---|
| 1A | 14.0 | 9.6 | 6.6 | 4.2 | 2.6 | 1.4 | 61.7 | 27* | 24.3 | 25.6 |
| 1B | 8.5 | 1.9 | 4.8 | 5.1 | 3.6 | 2.4 | 73.8 | 22.3 | 17.7 | 10.4 |
| 2A | 14.0 | 9.1 | 6.3 | 3.8 | 2.3 | 1.2 | 63.3 | 27* | 22.7 | 19.8 |
| 2B | 5.2 | 1.2 | 4.4 | 5.3 | 4.3 | 2.6 | 77.0 | 18.6 | 17.7 | 6.7 |
| 3A | 13.6 | 10.2 | 7.2 | 4.6 | 3.0 | 1.8 | 59.8 | 27* | 26.7 | 20.1 |
| 3B | 0.3 | 5.5 | 7.5 | 5.8 | 3.9 | 2.2 | 75.0 | 16.5 | 24.8 | 4.5 |
| 4A | 9.6 | 6.9 | 5.0 | 3.2 | 1.9 | 0.9 | 72.3 | 24.4 | 17.6 | 14.1 |
| 4B | 0.3 | 6.3 | 8.8 | 5.4 | 3.5 | 1.9 | 73.9 | 14.4 | 25.8 | 5.2 |
| 5A | 14.0 | 9.6 | 6.6 | 4.2 | 2.6 | 1.5 | 61.5 | 27* | 24.5 | 20.1 |
| 5B | 9.4 | 2.4 | 5.7 | 5.0 | 3.5 | 2.0 | 72.0 | 25.4 | 18.6 | 11.7 |
| 6A | 11.7 | 8.3 | 5.7 | 3.5 | 2.1 | 1.2 | 67.5 | 26.2 | 20.8 | 17.0 |
| 6B | 2.1 | 4.6 | 6.1 | 4.7 | 3.2 | 1.9 | 77.5 | 16.3 | 20.5 | 5.6 |
| 6C | 0.1 | 3.7 | 6.9 | 5.5 | 3.7 | 2.3 | 77.9 | 13.0 | 22.1 | 3.3 |
| 6D | 0.0 | 2.8 | 6.4 | 5.5 | 3.8 | 2.2 | 79.3 | 13.0 | 20.7 | 2.7 |
| 6E | 0.0 | 2.1 | 5.9 | 5.6 | 4.0 | 2.4 | 80.2 | 12.4 | 20.0 | 2.2 |
| 6F | 0.0 | 1.1 | 4.8 | 5.4 | 4.0 | 2.4 | 82.3 | 11.7 | 17.7 | 1.5 |
| 6C + 5% Glu | 5.0 | 3.5 | 6.6 | 5.2 | 3.5 | 2.2 | 74.1 | 16* | 20.8 | 8.1 |
| 6F + 5% Glu | 5.0 | 1.0 | 4.6 | 5.1 | 3.8 | 2.3 | 78.2 | 14* | 16.8 | 6.4 |
| 6D + 10% Glu | 10.0 | 2.5 | 5.8 | 5.0 | 3.4 | 2.0 | 71.4 | 20* | 18.7 | 12.4 |
| 6E + 10% Glu | 10.0 | 1.9 | 5.3 | 5.0 | 3.6 | 2.2 | 72.2 | 20* | 18.0 | 12.0 |
| 6F + 10% Glu | 10.0 | 1.0 | 4.3 | 4.9 | 3.6 | 2.2 | 74.1 | 19* | 16.0 | 11.4 |
| 9A | 0.3 | 2.7 | 5.8 | 5.8 | 4.3 | 2.5 | 78.7 | 11* | 21.1 | 2.8 |
| 9B | 8.5 | 1.9 | 4.8 | 5.1 | 3.6 | 2.4 | 73.8 | 18* | 17.8 | 10.4 |

*Estimated DE according to the formula: DE = DP 1 + 0.526(DP 2) + 0.357(DP 3) + 0.270(DP 4) + 0.217(DP 5) + 0.182(DP 6) + 0.06(DP 7+).

What is claimed is:

1. A method of treating a hydrolyzate product of hydroxypropyl starch to produce a low calorie bulking agent with improved flavor comprising the steps of:
   (a) obtaining a hydrolyzate product of hydroxypropyl starch; and
   (b) removing low molecular weight off-flavor components characterized by molecular weights of from about 200 to about 350 daltons from said hydroxypropyl starch hydrolyzate product.

2. The method of claim 1 wherein said product is treated by reverse osmosis.

3. The method of claim 1 wherein said product is treated by ultrafiltration.

4. The method of claim 1 wherein said product is treated by simulated moving bed chromatography.

5. The method of claim 1 wherein said off-flavor components comprise mono- or dihydroxypropyl glucose.

6. The method of claim 1 wherein the resulting product comprises greater than about 15% by weight DP 2-6 hydrolyzate polymers, is characterized by a DE value of from about 12 to about 45 and is characterized by a DP 1-3 content such that the sum of $C_1+0.5(C_2)+0.2(C_3)$ is greater than about 5 wherein $C_1$, $C_2$ and $C_3$ are the respective weight percent concentrations of DP 1 monomers, DP 2 polymers and DP 3 polymers in the final product.

7. A method of treating a hydrolyzate product of hydroxypropyl starch to produce a low calorie bulking agent with improved flavor comprising the steps of:
   (a) obtaining a hydrolyzate product of hydroxypropyl starch;
   (b) removing low molecular weight off-flavor components characterized by molecular weights of from about 200 to about 350 daltons from said hydroxypropyl starch hydrolyzate product; and
   (c) adding low molecular weight starch hydrolyzate components to said hydrolyzate product such that the resulting product comprises greater than about 15% by weight DP 2-6 hydrolyzate polymers, is characterized by a DE value of from about 12 to about 45 and is characterized by a DP 1-3 content such that the sum of $C_1+0.5(C_2)+0.2(C_3)$ is greater than about 5 wherein $C_1$, $C_2$ and $C_3$ are the respective weight percent concentrations of DP 1 monomers, DP 2 polymers and DP 3 polymers in the final product.

8. The method of claim 7 wherein low molecular weight starch hydrolyzate components selected from the group consisting of DP 1-3 hydrolyzate components are added to the starch hydrolyzate product.

9. The method of claim 7 wherein glucose is added to the starch hydrolyzate product.

10. The method according to claim 7 wherein said hydrolyzate product to be treated comprises greater than about 15% by weight DP 2-6 hydrolyzate polymers and is characterized by a DE value of from about 20 to about 45.

11. A hydrolyzate product produced according to the method of claim 6, 7 or 10.

12. A hydrolyzate product of hydroxypropyl starch which is substantially free of off-flavor components characterized by molecular weights of from about 200 to about 350 daltons.

13. The hydrolyzate product of claim 12 which is substantially free of hydroxypropyl glucose.

14. The hydrolyzate product of claim 12 which comprises greater than 15% DP 2-6 hydrolyzate polymers, is characterized by a DE value of from about 12 to about 45 and is characterized by a DP 1-3 content such that the sum of $C_1+0.5(C_2)+0.2(C_3)$ is greater than about 5 wherein $C_1$, $C_2$ and $C_3$ are the respective weight percent concentrations of DP 1 monomers, DP 2 polymers and DP 3 polymers in the final product.

15. A reduced calorie sweetener composition comprising the hydroxypropyl starch hydrolyzate product of claim 12.

16. A method for reducing the calorie content of a food product comprising sucrose or another starch hydrolyzate product comprising the step of replacing all or a portion of said sucrose or other starch hydrolyzate product with the hydroxypropyl starch hydrolyzate product of claim 12.

17. In a food product comprising sucrose or other starch hydrolyzate products, the improvement comprising replacing all or a portion of said sucrose or starch hydrolyzate product with the hydroxypropyl starch hydrolyzate product of claim 12.

* * * * *